US012630577B2

(12) United States Patent
Hollas et al.

(10) Patent No.: US 12,630,577 B2
(45) Date of Patent: May 19, 2026

(54) IRON COMPLEXES WITH PHOSPHONATE-BASED LIGANDS AS RFB ANOLYTE MATERIALS

(71) Applicant: BATTELLE MEMORIAL INSTITUTE, Richland, WA (US)

(72) Inventors: Aaron M. Hollas, Richland, WA (US); Guosheng Li, Richland, WA (US); Minyuan Mil Li, Richland, WA (US); Qian Huang, Richland, WA (US); David M. Reed, Richland, WA (US); Vincent L Sprenkle, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 559 days.

(21) Appl. No.: 17/889,067

(22) Filed: Aug. 16, 2022

(65) Prior Publication Data

US 2023/0051932 A1 Feb. 16, 2023

Related U.S. Application Data

(60) Provisional application No. 63/233,595, filed on Aug. 16, 2021.

(51) Int. Cl.
*C07F 15/02* (2006.01)
*H01M 8/18* (2006.01)
(52) U.S. Cl.
CPC ........... *C07F 15/025* (2013.01); *H01M 8/188* (2013.01); *H01M 2300/00* (2013.01)

(58) Field of Classification Search
CPC .. C07F 15/025; H01M 8/188; H01M 2300/00
See application file for complete search history.

(56) References Cited

U.S. PATENT DOCUMENTS

| | | | |
|---|---|---|---|
| 9,520,611 B2 | 12/2016 | Park et al. | |
| 2001/0028977 A1* | 10/2001 | Kazacos | H01M 8/20 |
| | | | 429/188 |
| 2010/0145066 A1* | 6/2010 | Notte | C07F 9/3808 |
| | | | 558/158 |
| 2014/0028260 A1* | 1/2014 | Goeltz | H01M 8/08 |
| | | | 429/500 |
| 2016/0211539 A1* | 7/2016 | Goeltz | H01M 8/188 |

FOREIGN PATENT DOCUMENTS

WO 2014/018495 A2 1/2014

OTHER PUBLICATIONS

Zhang et. al.,"Boosting the thermal stability of electrolytes in vanadium redox flow batteries via 1-hydroxyethane-1,1-diphosphonic acid" Journal of Applied Electrochemistry (2020) 50, 255-264 (Year: 2020).*
Son, et al. Journal of Solid State Chemistry, 164, 367, 2002 (Year: 2002).*

(Continued)

*Primary Examiner* — Alexander Usyatinsky
(74) *Attorney, Agent, or Firm* — Kristen M. Clark

(57) ABSTRACT

An anolyte for a redox-flow battery (RFB) comprising a metal-ion complex and a phosphonate-based ligand having a phosphonic group wherein the phosphonic acid group is directly coordinated to a metal-ion.

17 Claims, 10 Drawing Sheets

(56)     References Cited

OTHER PUBLICATIONS

Zolotareva et.al. "Preparation of Water-Soluble Iron and Manganese Chelates with Oxyethylidenediphosphonic Acid" Russian Journal of General Chemistry, 2013, vol. 83, No. 11, pp. 1985-1989 (Year: 2013).*

Cabrera., P. J., et al., Complexes Containing Redox Noninnocent Ligands for Synnetric, Multielectron Transfer Nonaqueous Redox Flow Batteries, The Journal of Physical Chemistry, 119, 2015, 1582-1589.

Fischer, P., et al., Family Tree for Aqueous Organic Redox Couples for Redox Flow Battery Electrolytes: A Conceptual Review, Molecules, 27, 560, 2022, 1-39.

Gong, K., et al., All-Soluble All-Iron Aqueous Redox-Flow Battery, ACS Energy Letters, 1, 2016, 89-93.

Popov, I. A., et al., Impact of Ligand Substitutions on Multielectron Redox Properties of Fe Complexes Supported by Nitrogenous Chelates, ACS Omega, 3, 2018, 14766-14788.

* cited by examiner

——— FeCl$_2$ + 2 equiv. Etidronic Acid, pH8

Potential (V vs Ag/AgCl)

——— FeCl$_2$ + NTMPA, pH8

Potential (V vs Ag/AgCl)

IRON COMPLEXES WITH PHOSPHONATE-BASED LIGANDS AS RFB ANOLYTE MATERIALS

CROSS-REFERENCE TO RELATED APPLICATIONS

This invention claims priority from provisional patent application No. 63/233,595, filed Aug. 16, 2021, and entitled Iron Complexes with Phosphonate-Based Ligands as RFB Anolyte Materials.

ACKNOWLEDGEMENT OF GOVERNMENT SUPPORT

This invention was made with Government support under Contract DE-AC0576RL01830 awarded by the U.S. Department of Energy. The Government has certain rights in the invention.

BACKGROUND

A redox flow battery (RFB) stores electrical energy in reduced and oxidized species dissolved in two separate electrolyte solutions. The negative electrolyte and the positive electrolyte circulate through cell electrodes separated by an ion exchange membrane or a separator. Redox flow batteries are advantageous for energy storage because they are capable of tolerating fluctuating power supplies, repetitive charge/discharge cycles at maximum rates, overcharging, over-discharging, and because cycling can be initiated at any state of charge.

With a growing push for decarbonization of the electric grid and the need to balance intermittent power generation from renewable resources, the need for scalable energy storage technologies has gained significant attention. While traditional lithium-ion battery technologies excel at high power/low energy applications, long-duration energy storage capable of supplying multi-hour to multi-day power is not viable with existing battery technologies. Redox flow batteries are well suited to long duration storage since their modular design allows for simple upscaling of the energy content of a system by increasing the size of the external storage tanks. However, most of the current redox flow battery chemistries do not meet the cost or scale requirements for long duration systems. For instance, vanadium redox flow batteries are hindered by the high cost of the vanadium, all-iron systems utilizing $Fe^0$ plating at the anode cannot independently scale their energy content since the size of the power generating stack determines the system energy (which also occurs with $Zn^0$-based systems), and new technologies based on aqueous soluble organics still require significant development to allow for scalable synthesis and improvements to long-term stability.

The concept of using iron coordination complexes has recently received attention, and some iron complexes based on EDTA, amino acids, hydroxy-acids, polypyridyl ligands, and similar ligands have been reported. However, demonstration of iron complexes that meet all the solubility, voltage, and stability requirements for a viable flow battery has not yet occurred. Therefore, iron complexes that can meet all these criteria and remain low-cost are of significant interest.

SUMMARY

The following provides a description of the application of phosphonate-based ligands as iron chelators to enable viable iron complexes that can be applied as redox-flow battery anolytes. Bearing phosphonate groups, which are 2-charged when deprotonated, these complexes allow for more control over the ionic charge of the overall complex and can increase solubility, especially compared to traditional carboxylic acid-based ligands whose carboxylate group introduces a 1-charge. This is especially notable for Fe(EDTA) complexes, which are carboxylate-based and have only a net 1-charge in their Fe(III) complex and have a resultingly low solubility in water (<0.2 M).

Disclosed herein are iron complexes with phosphonate-based ligands as RFB and analyte materials. As a representative example of the phosphonate class of ligands, etidronic acid is capable of strongly binding Fe(III) ions in a 2:1 ratio and is highly soluble at pH 8. At this mild pH the complex bears a 5-charge, yielding a water-soluble species, specifically >0.8 M solubility. This highly negative charge of the complex further contributes to high RFB performance by negatively shifting the reduction potential of the iron center. Coupled with a ferrocyanide catholyte, the iron etidronic acid complex yields an RFB with a cell voltage of ~1.15 V at full charge.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

BRIEF DESCRIPTION OF THE DRAWINGS

Embodiments of the invention are described below with reference to the following accompanying drawings.

FIG. 1 represents a 2:1 complex between etidronic acid and iron.

FIG. 2 represents a 3:1 complex between etidronic acid and iron.

FIG. 4A represents capacity retention data for the solution cycled at 20 mA/cm² long-term. FIG. 4B represents voltage profiles for varied current densities.

DETAILED DESCRIPTION

Figure 3A:
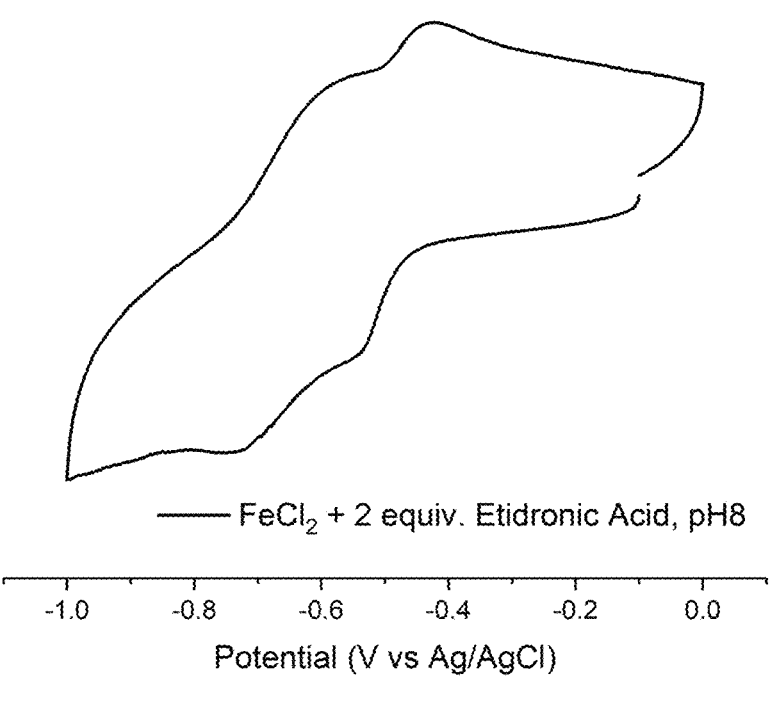
FIGS. 3A and 3B illustrate cyclic voltammograms for mixtures of etidronic acid and nitrilotri(methylenephosphonic acid) with iron.

The installation of grid-scale energy storage systems is increasing rapidly. These systems are being installed for a multitude of purposes by utility companies and are currently predominantly lithium-ion systems. While this technology is mature, it poses safety hazards at this this scale and still has a high cost for systems with multi-hour ratings.

The present disclosure alleviates safety concerns, since it is water-based and inherently non-flammable, uses non-toxic metals, and operates at benign pH. The use of iron and commodity-scale ligands results in low materials cost that can find application in long-duration energy storage installations where lithium-ion or VRFB would not be cost effective.

Described herein are iron complexes based on multidentate ligands with phosphonate coordination groups. These metal complexes are used as anolyte materials in aqueous redox flow batteries. Proposed all soluble iron flow batteries have a battery structure having an anolyte tank and a catholyte tank, and a flow battery stack. Compared with the vanadium redox flow battery (VRFB), the main advantage achieved by the present disclosure is the use of a cost-effective iron complex-based electrolyte to replace the high-cost vanadium electrolyte, thereby further reducing the cost of RFB technology.

The following provides a large and diverse set of chemistries that have been investigated for RFB use. While not exhaustive, the following list describes other RFB technologies and their comparison to the present disclosure.

In an example, all vanadium RFB is the most advanced RFB technology available and offers high solubility, high voltage, and long service life. However, the vanadium used by the system is currently very costly and can introduce a significant hurdle to widespread adoption of RFBs. The currently proposed iron-phosphonate complex system offers a low-cost alternative based on iron.

In another example, hybrid flow batteries, which deposit a solid metal material at the anode, have been described with all iron systems, zinc/bromine systems, and iron/zinc systems. However, the hybrid design does not allow independent tuning of energy and power, limiting the potential applications of the RFB technology to shorter duration uses. The proposed system is a true flow battery, with anolyte and catholyte materials that remain soluble throughout charging and discharging and allow true decoupling of energy and power in the system.

In another example, other iron complexes have been proposed based on EDTA, amino acids, hydroxy-acids, polypyridyl ligands, and similar ligands. As noted earlier, the use of phosphonate groups on the ligands provides additional tenability to the overall charge of the complex which can improve solubility, decrease material crossover through the ion-selective membrane, and improve cell voltage.

The embodiments described herein are directed to iron complexes with phosphonate-based ligands as RFB and anolyte materials. The application of phosphonate-based ligands as iron chelators to enable viable iron complexes that can be applied as redox-flow battery analytes. Bearing phosphonate groups, which are 2-charged when deprotonated, these complexes allow for more control over the ionic charge of the overall complex and can increase solubility, especially compared to traditional carboxylic acid-based ligands whose carboxylate group introduces a 1-charge. This is especially notable for Fe(EDTA) complexes, which are carboxylate-based and have only a net 1-charge in their Fe(III) complex and have a resultingly low solubility in water (<0.2 M).

A wide range of phosphonate-based molecules that can be used as ligands are available commercially, with a non-exclusive list which includes etidronic acid, nitrilotri(methylenephosphonic acid), ethylenediaminetetra(methylenephosphonic acid), iminodi(methylphosphonic acid), methylenediphosphonic acid, (aminomethyl)phosphonic acid, 2-aminoethylphosphonic acid, N,N-bis(phosphonomethyl)glycine, N-(phosphonomethyl)glycine, N-(phosphonomethyl)iminodiacetic acid, phosphonoacetic acid, pyrophosphate, trimetaphosphate.

Experimental data for two ligands, etidronic acid and nitrilotri(methylenephosphonic acid), applied to two different metal ions, iron and titanium, are described. Ligand to metal ratios ranging from 1-3:1 are described as well as pH ranges from 6-11. These ligands show rich metal binding chemistry; etidronic acid can form species with a single ligand bound to the metal center with free coordination sites occupied by aqua, hydroxo, or oxo groups that may be terminal or bridging, or bridged by another etidronic acid-metal complex to form a multimetallic species. The ligand may also form 2:1 complexes where the metal center coordination sphere is fully saturated by the etidronic acid ligands, or where 1-2 coordination sites are occupied by aqua, hydroxo, or oxo groups. Further, the metal center may be coordinated by 3 etidronic acid ligands. Similar coordination environments where ligands can act as mono-, bi-, or tridentate can be expected for the related phosphonate ligands.

In some embodiments, the pH range can be 6-14. Complexes formed between iron and etidronic acid are also capable of electrochemical cycling at elevated pHs up to 14. For example, voltage profiles for a 20 mL solution that is 0.5M in $FeCl_3$ with 1 equiv. of etidronic acid and was treated with 6 equivalents of KOH and additional 7 drops of 10M NaOH were cycled in elevated pH up to 14. This anolyte was cycled at 20 mA/cm$^2$ against 20 mL of 0.5M ferrocyanide in a solution of 1.5M KCl and 0.1M KOH. Additionally, and/or alternatively, analytes comprised of a mixture of iron and titanium can also be utilized. For example, voltage profiles for a 14 mL solution that is 0.35M in $FeCl_3$, 0.35M in $TiOSO_4$, and 1.4 M in etidronic acid which was treated with aqueous $NH_3$ until pH 8 and then brought to 0.1M in $(NH_4)_2HPO_4$. This anolyte was cycled at 20 mA/cm$^2$ against a solution that was 0.7M ferrocyanide, 0.036M ferricyanide, 0.35M $(NH_4)_2SO_4$, 1.05M $NH_4Cl$, and 0.1M in $(NH_4)_2$ $HPO_4$.

Figures 1, 2:
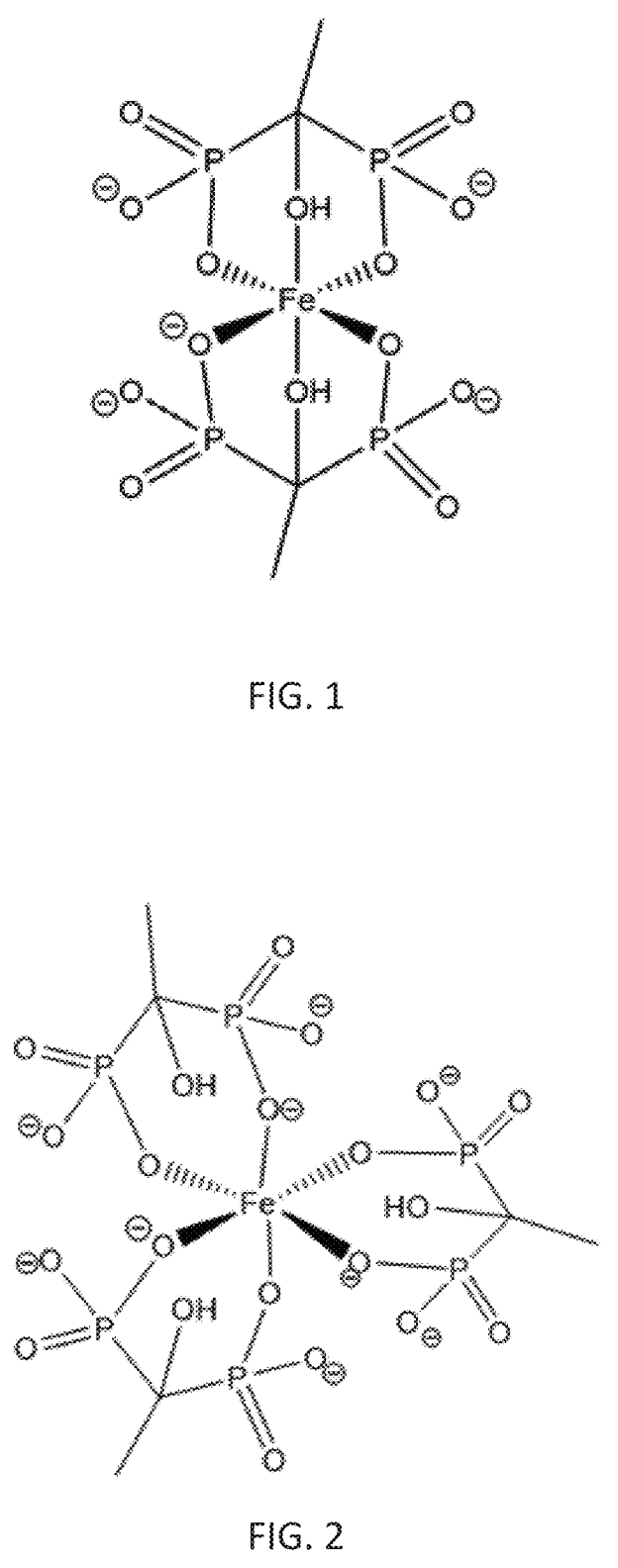

Referring to the drawings, FIG. 1 and FIG. 2 illustrate the 2:1 and 3:1 complexes between etidronic acid and iron, described above. FIG. 1 is an illustration representative binding motif for an etidronic acid ligand bound as tridentate ligand to an iron metal center. FIG. 2 is an illustration representative binding motif for an etidronic acid ligand bound as bidentate ligand to an iron metal center.

Figure 3B:
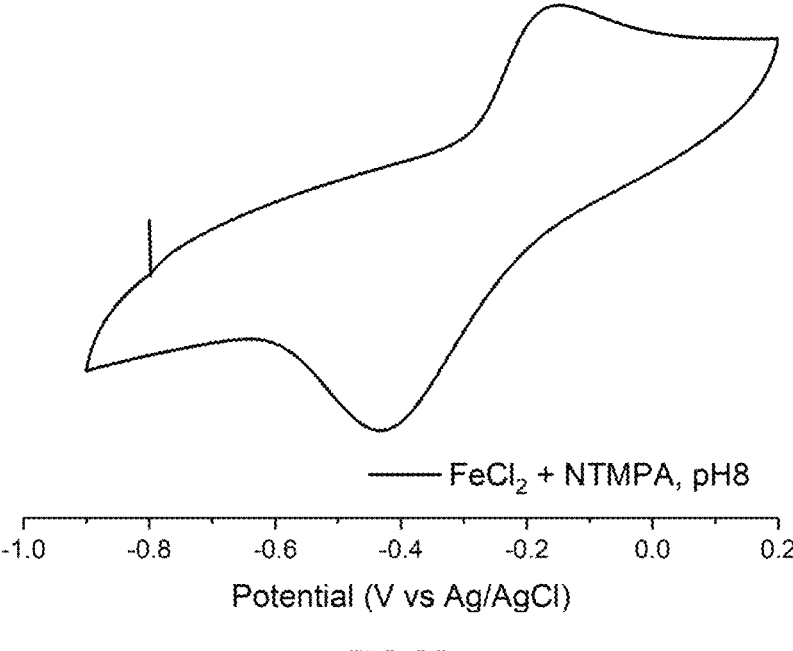

FIGS. 3A and 3B represent cyclic voltammograms for mixtures of etidronic acid and nitrilotri(methylenephosphonic acid) with iron. The cyclic voltammograms of iron complexes with etidronic acid shown in FIG. 3A and nitrilotri(methylenephosphonic acid) shown FIG. 3B were obtained at pH 8 on an electrode of glassy carbon with ketjen black drop cast to the electrode, having a scan rate of 100 mV/s.

As a representative example of the phosphonate class of ligands, etidronic acid is capable of strongly binding iron ions and, in mixtures with a ligand to metal ratio of 2:1, is highly water-soluble at pH 8, in particular >0.8 M solubility. Coupled with a ferrocyanide catholyte, the iron etidronic acid complex yields an RFB with an OCV of ~1.15 V at full charge. Representative battery cycling data for these complexes are provided in FIGS. 4A and 4B for a system that demonstrate up to 7 Wh/L.

Figure 4A:
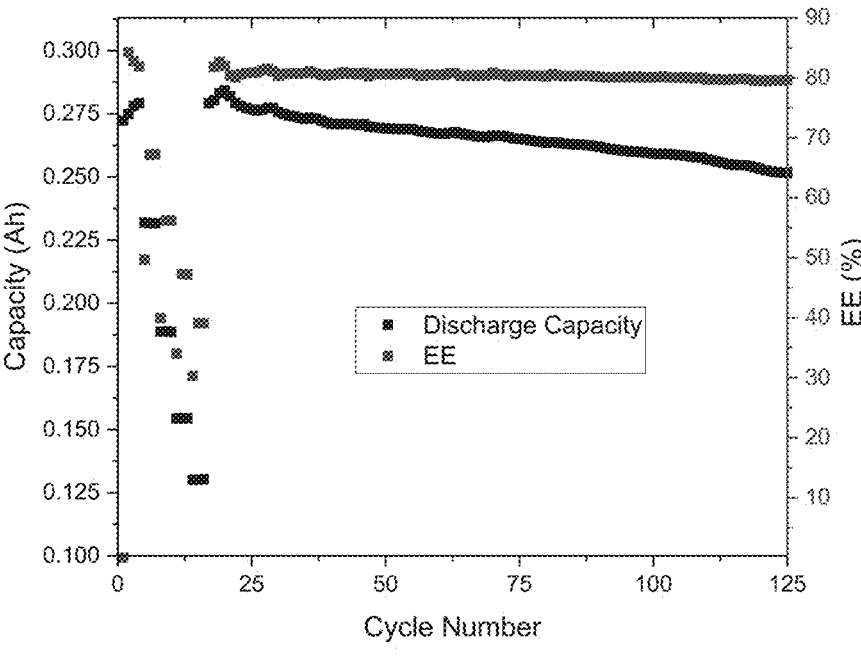
FIGS. 4A and 4B are graphs illustrating battery cycling data for the complexes.
Figure 4B:
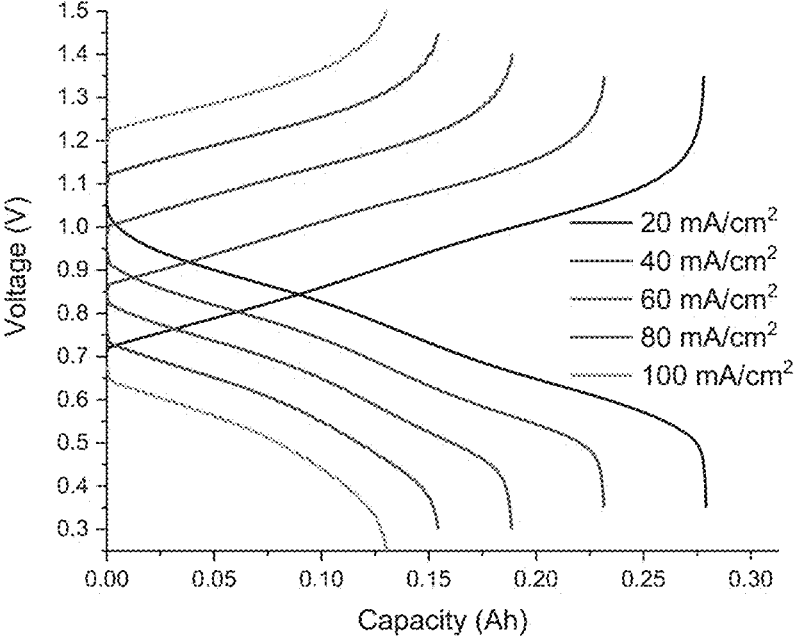

As shown in FIGS. 4A and 4B, flow battery data from an anolyte solution of 0.9 M $FeCl_2$ with 2 equivalents of etidronic acid, which was brought to a pH of ~8 with 2 equivalents of NaOH per etidronic acid and then aqueous $NH_3$, and a catholyte solution of 0.7 M $Na_3Fe(CN)_6$ with a supporting electrolyte of 2 M $NH_4Cl$ and additional aqueous $NH_3$ until pH of ~8. FIG. 4A illustrates capacity retention data for the solution cycled at 20 mA/cm$^2$ long-term. FIG. 4B illustrates voltage profiles for varied current densities.

Additionally, the operative pH of the system may be extended to both higher and lower pHs. Voltage profiles for flow batteries at buffered pHs between 6-7 (FIG. 5A, described further below) and also at a pH of 10-11 (FIG. 5B, described further below) are provided in FIGS. 5A and 5B.

Figure 5A:
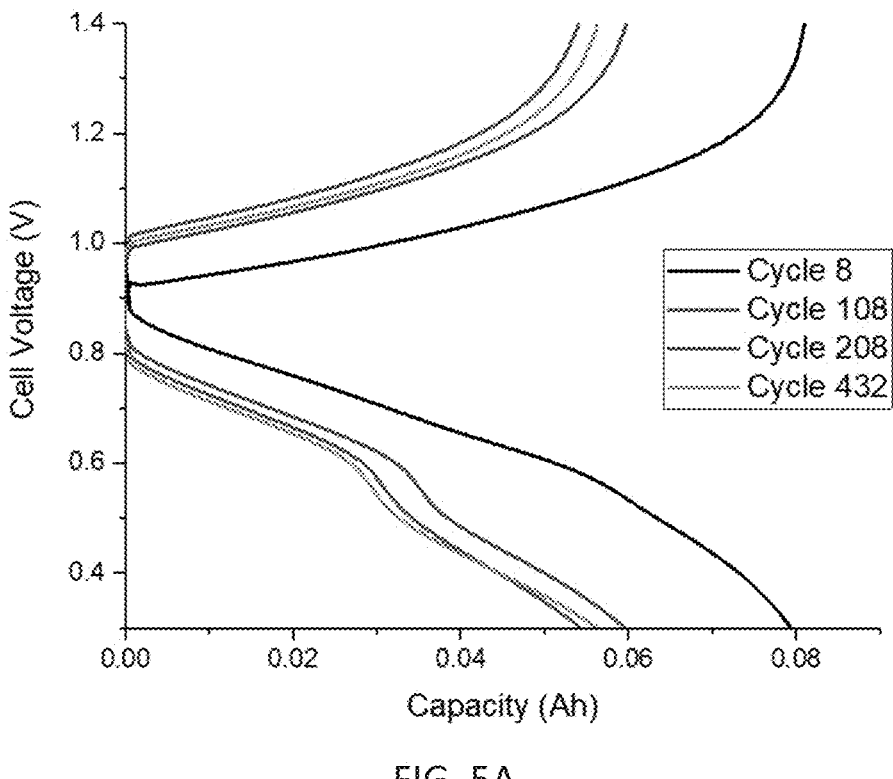
FIGS. 5A and 5B illustrates long-term voltage profile data obtained at 20 mA/cm².
Figure 5B:
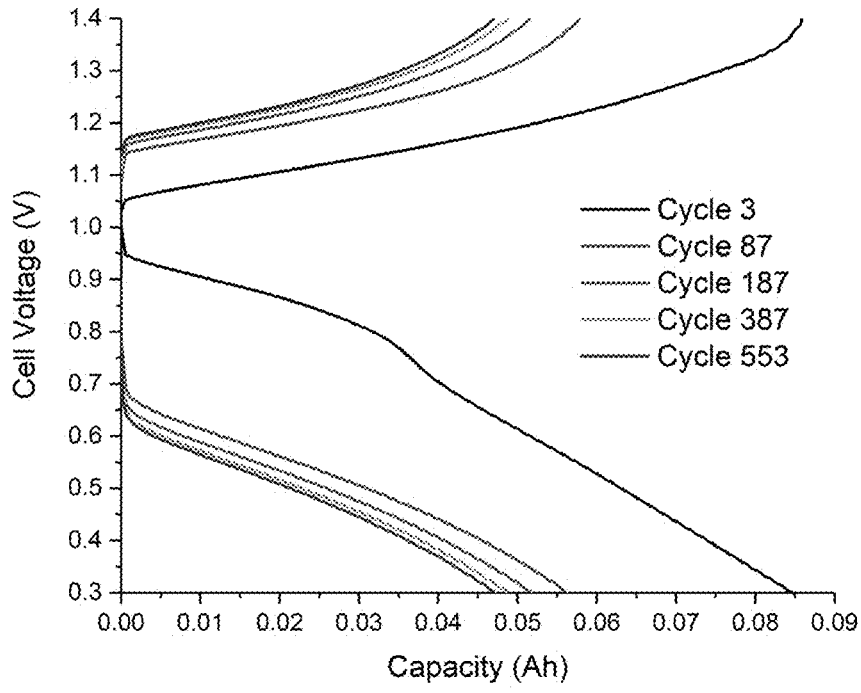

FIGS. 5A and 5B, illustrates long-term voltage profile data obtained at 20 mA/cm$^2$. FIG. 5A is a depiction of voltage profiles from a flow battery comprised of 11 mL of anolyte that is 0.45M in $Fe^{3+}$ prepared from $FeBr_3$ and 2.1 equivalents of etidronic acid, then treated with 4 equivalents of base per etidronic acid (equal parts NaOH and KOH) to quench all phosphonic acid protons in solution, which was then brought to 0.45M $(NH_4)_2HPO_4$ and 0.45M $(NH_4)H_2PO_4$. The catholyte was 0.45M $Fe(CN)_6^{4-}$ from equal parts $Na_4Fe(CN)_6$ and $K_4Fe(CN)_6$ with the same buffer of 0.45M $(NH_4)_2HPO_4$ and 0.45M $(NH_4)H_2PO_4$.

FIG. 5B is a depiction of voltage profiles from a flow battery comprised of 10.5 mL of anolyte that is 0.476 M in $Fe^{2+}$ prepared from $FeCl_2$ and 2.1 equivalents of etidronic acid, then treated with 4 equivalents of base per etidronic acid (equal parts NaOH and KOH) to quench all phosphoric acid protons in solution and then treated with an additional 0.4 equivalents of base per $Fe^{2+}$. The catholyte was 0.5 M $K_3Fe(CN)_6$ with 1 M NaCl as supporting electrolyte.

Figure 6:
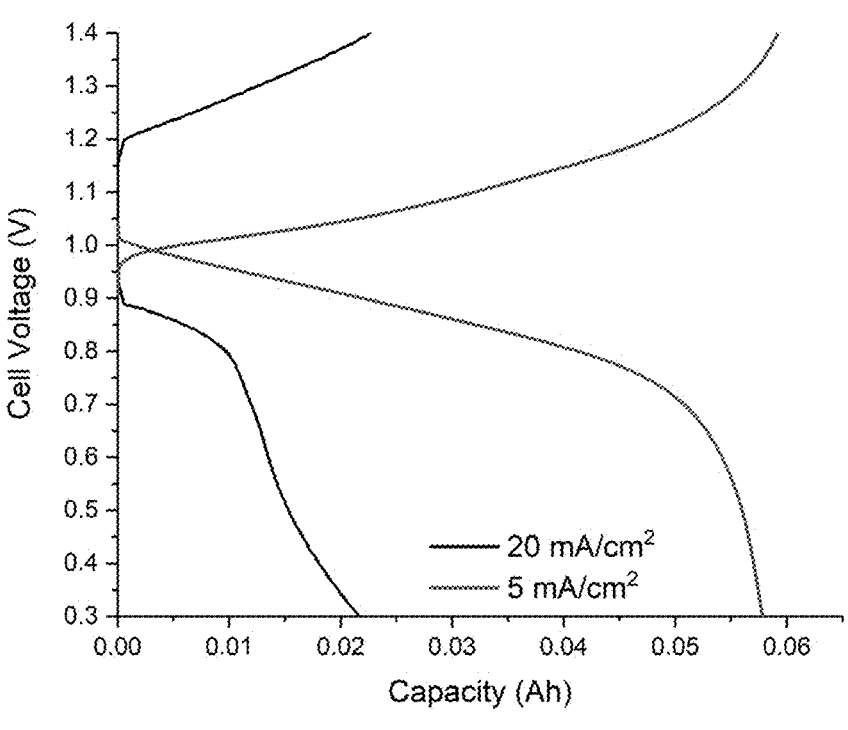
FIG. 6 illustrates performance of an electrolyte comprised of a 1.05:1 etidronic acid to iron ratio.

Referring to FIG. 6, in addition to mixtures containing ≥2:1 ratios of etidronic to iron, mixtures with lower ligand content are attainable and can be subjected to flow cell operation. Performance of an electrolyte comprised of a 1.05:1 etidronic acid to iron ratio is provided in FIG. 6. As shown in FIG. 6, voltage profile data obtained at 20 mA/cm$^2$ and 5 mA/cm$^2$ from a flow battery comprised 7.5 mL of an anolyte that is 0.67 M in $Fe^{2+}$ prepared from $FeCl_2$ and 1.05 equivalents of etidronic acid, which was then treated with 5 equivalents of base per iron (using equimolar NaOH and KOH). The catholyte was comprised of 0.7 M $K_3Fe(CN)_6$ with 1.4 M NaCl as supporting electrolyte.

Figure 7A:
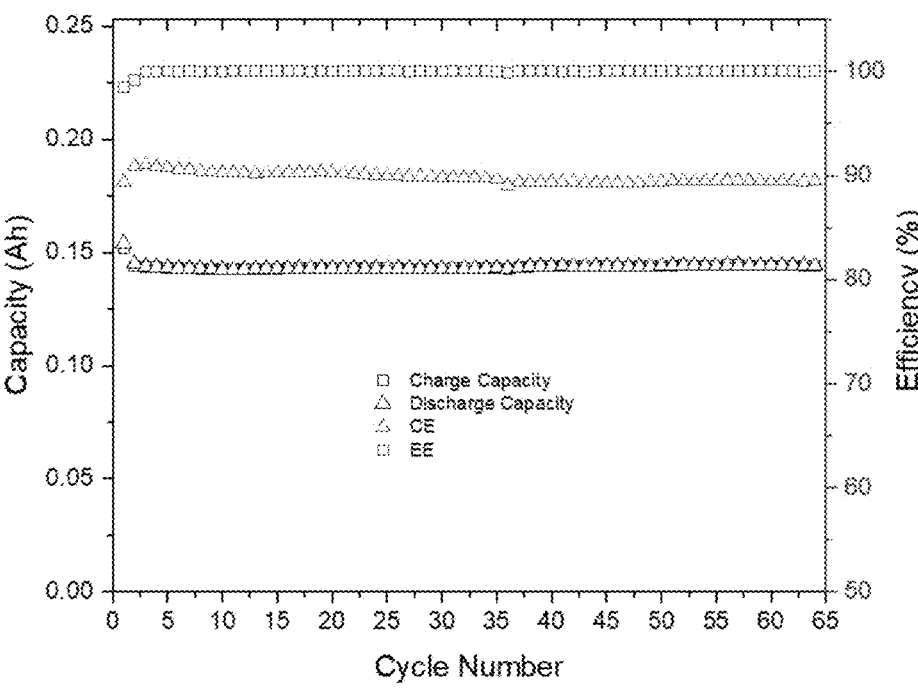
FIGS. 7A and 7B are graphical depictions of etidronic acid used to coordinate titanium ions.
Figure 7B:
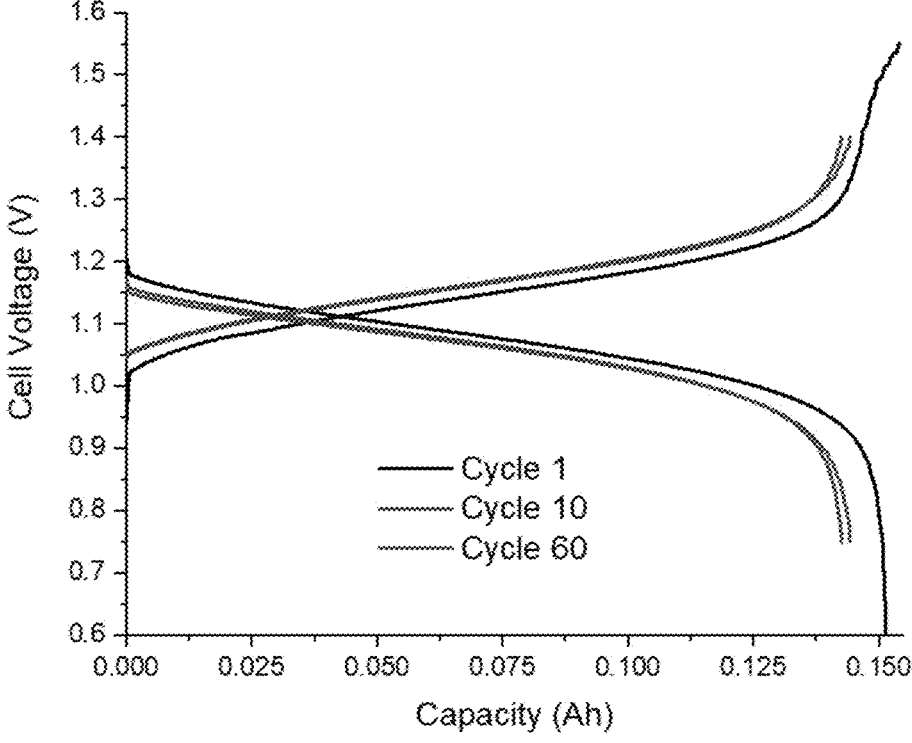

Referring to FIGS. 7A and 7B, in addition to the iron-based electrolytes described above, etidronic acid can be used to coordinate titanium ions and produce higher voltage electrolytes. Similar to the iron electrolytes, ligand to metal ratios ranging from 1:1 to ≥2:1 can be applied in the titanium-etidronic acid system and yield total metal ion solubilities of >0.7 M.

Shown in FIGS. 7A and 7B, titanium-based electrolytes with 3.3 equivalents of etidronic acid per titanium show stable cycling and an OCV at full charge of 1.24 V. With electrolytes containing 2:1 ligand to titanium ratio, a higher voltage event appears in addition to the voltage plateaus observed in FIG. 5 along with slightly lower efficiency and capacity retention. For the flow battery test using a 2:1 ratio, the flow cell used for the 13:1 test was drained of anolyte and rinsed with water, and then the anolyte reservoir was replaced with the 2:1 electrolyte and cycling was continued. This occurred at cycle 65, as seen in FIGS. 8A and 8B (described further below), with cycles 1-64 also shown in FIG. 6, above.

Flow battery data from an anolyte solution of ~0.45 M $TiOSO_4$ with 3.3 equivalents of etidronic acid, which was brought to a pH of ~8 with aqueous $NH_3$, and a catholyte solution of 0.7 M $Fe(CN)_6$ (from equimolar $Na_4Fe(CN)_6$ and $K_4Fe(CN)_6$), 0.035 M $K_3Fe(CN)_6$, and supporting electrolyte of 0.7M $(NH_4)_2SO_4$. FIG. 7A shows the capacity retention data for the solution cycled at 20 mA/cm$^2$ long-term. FIG. 7B shows the voltage profiles from selected cycles.

Figure 8A:
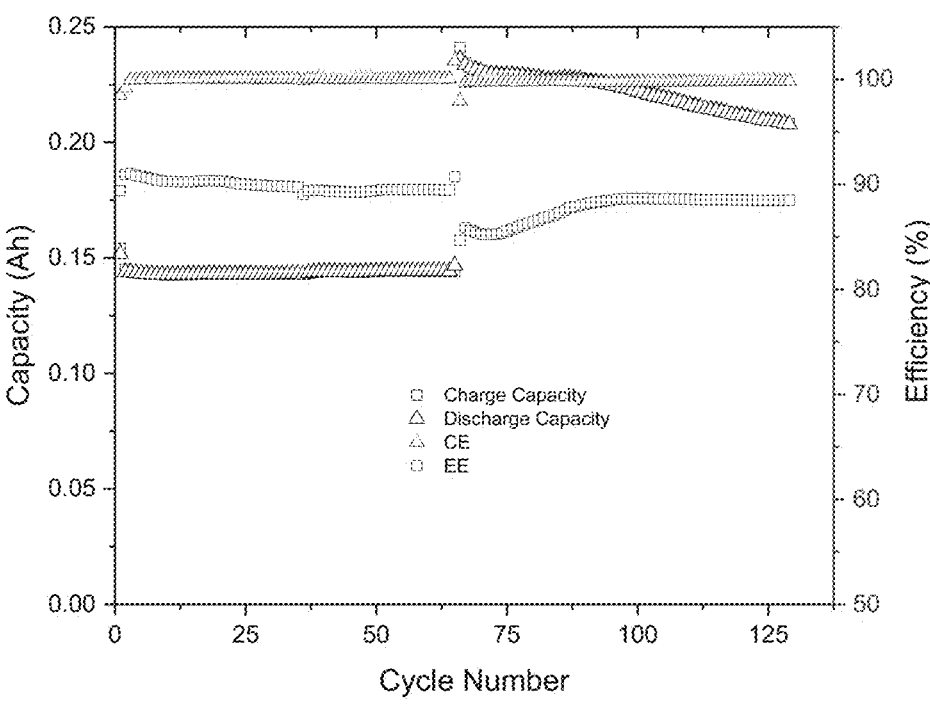
FIGS. 8A and 8B are graphical depictions of example cycle flow battery data from the anolyte solution.
Figure 8B:
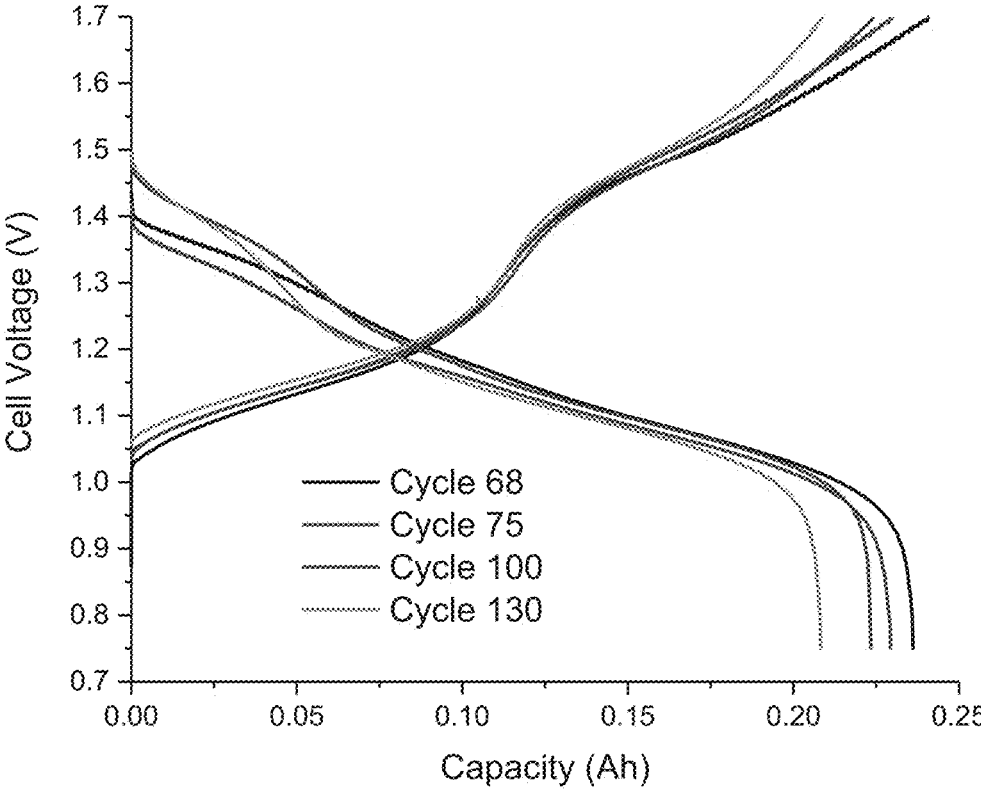

Referring to FIGS. 8A and 8B, beginning at cycle 65, flow battery data from an anolyte solution of ~0.74 M $TiOSO_4$ with 2 equivalent of etidronic acid brought to a pH of 8-9 with ammonia and a catholyte solution of 0.7 M $Fe(CN)_6^{4-}$ (from equal parts $Na_4Fe(CN)_6$ and $K_4Fe(CN)_6$), 0.035 M $K_3Fe(CN)_3$, and supporting electrolyte of 0.7 M $(NH_4)_2SO_4$. Cycled at 20 mA/cm$^2$.

Figure 9A:
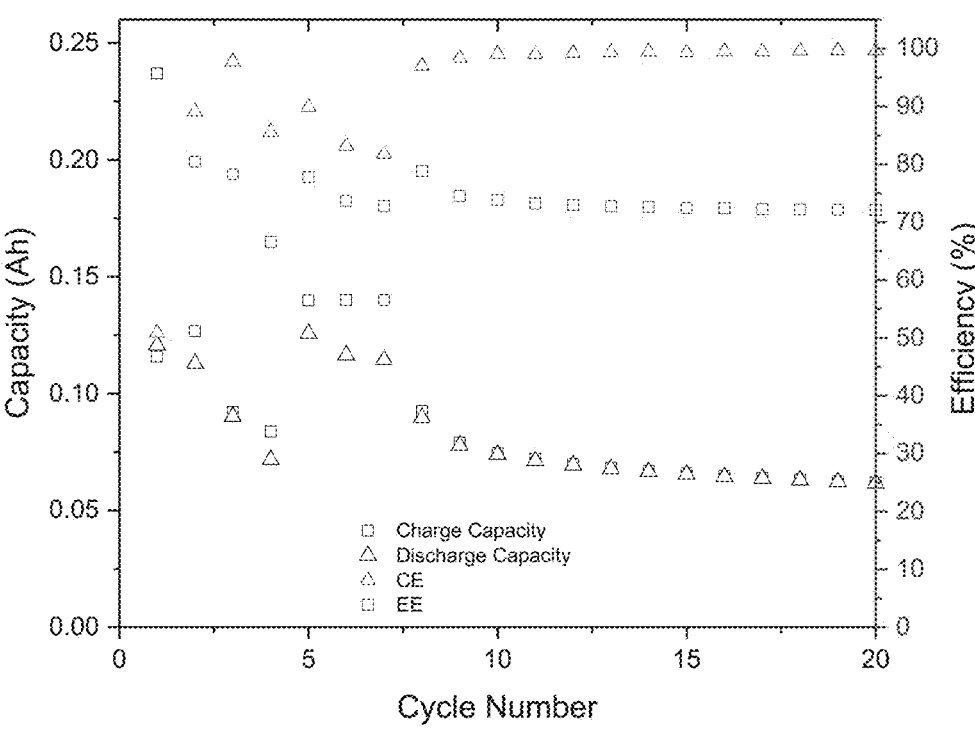
FIGS. 9A and 9B are graphical depictions of electrolyte solutions containing one (1) equivalent of etidronic acid per titanium provide high cell voltages.
Figure 9B:
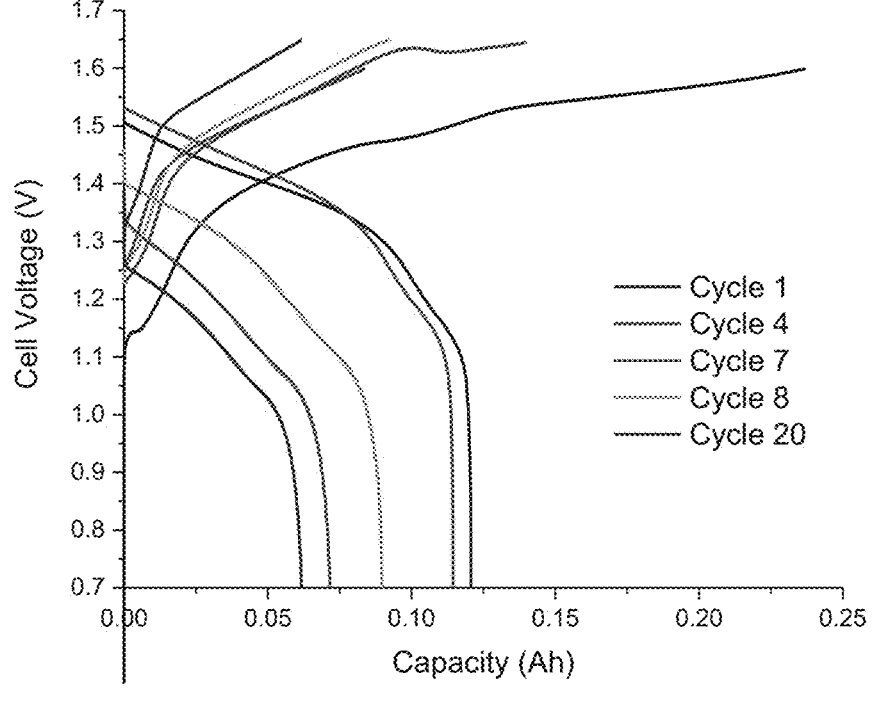

The titanium complexes may also be cycled with a lower 1:1 ratio of etidronic acid to titanium. As shown in FIGS. 9A and 9B, electrolyte solutions containing 1 equivalent of etidronic acid per titanium provide high cell voltages. The flow battery data from an anolyte solution of ~0.74 M $TiOSO_4$ with 1 equivalent of etidronic acid brought to a pH of 7 with ammonia and a catholyte solution of 0.7 M $Fe(CN)_6^{4-}$ (from equal parts $Na_4Fe(CN)_6$ and $K_4Fe(CN)_6$), 0.035 M $K_3Fe(CN)_3$, and supporting electrolyte of 0.7 M $(NH_4)_2SO_4$. After charging at cycle 4, the FLAT electrodes at the anolyte were replaced and the catholyte was exchanged. Cycled at 20 mA/cm$^2$.

In some embodiments, in addition to etidronic acid, other phosphonate-based ligands may be used to coordinate transition metals for application as redox flow battery electrolytes. As an additional example, nitrilotri(methylenephosphonic acid) has also been demonstrated with iron and titanium metal ions. In electrolyte mixtures with a 1:1 ligand to metal ratio, flow batteries utilizing iron or titanium produce the battery cycling performance provided in FIGS. 10A, 10B, 11A and 11B. In addition to the use of a single ligand, mixtures of different ligands may be used to yield stable-cycling electrolytes.

Figure 10A:
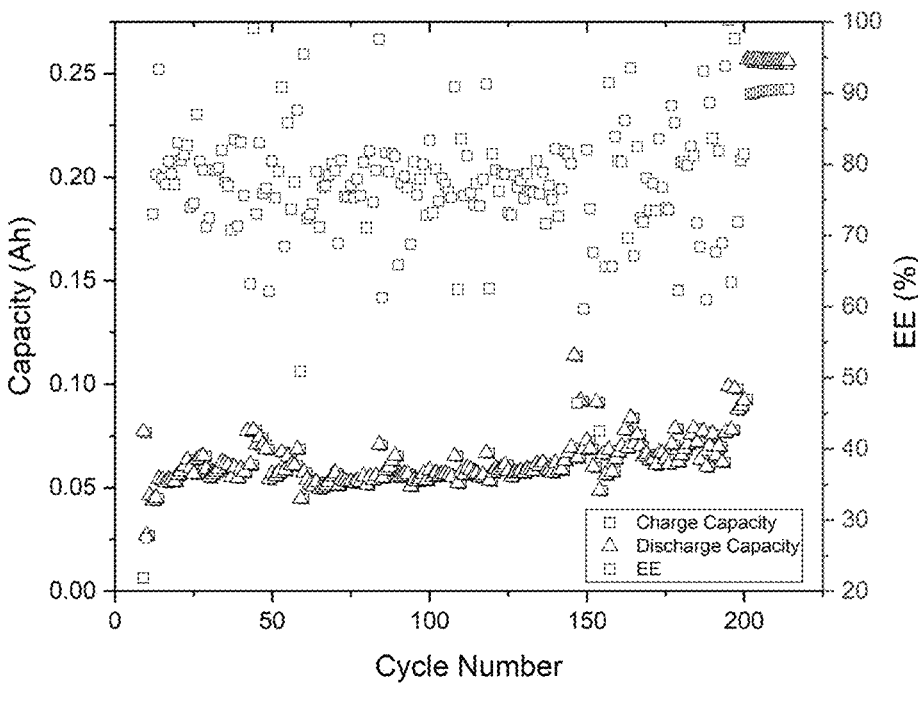
FIGS. 10A and 10B illustrates an example of flow battery data from an anolyte solution including voltage, cycling and capacity.
Figure 10B:
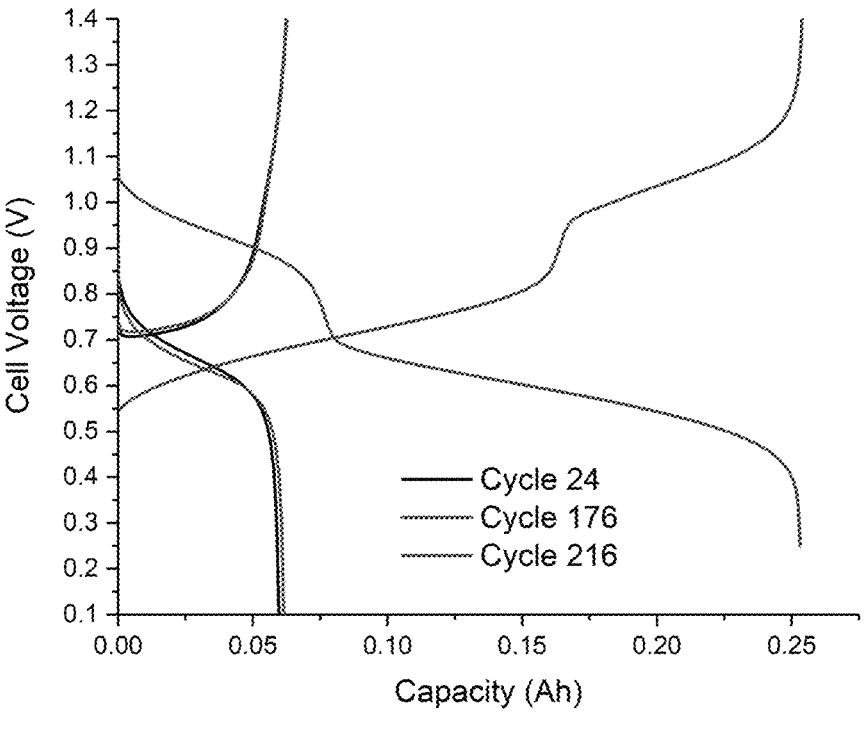

Referring to FIGS. 10A and 10B, the 1:1 mixture of nitrilotri(methylenephosphonic acid) and iron was treated with another equivalent of etidronic acid (pretreated with 4 equivalents of ammonia) at cycle 215, yielding improved material utilization and efficiency. FIGS. 10A and 10B show flow battery data from an anolyte solution of ~0.71 M $FeCl_3$ with 1 equivalent of nitrilotri(methylenephosphonic acid) brought to a pH of 8 with ammonia with an additional 0.1 M $(NH_4)_2HPO_4$ supporting electrolyte and a catholyte solution of 0.71 M $Fe(CN)_6^{4-}$ (from equal parts $Na_4Fe(CN)_6$ and $K_4Fe(CN)_6$), 0.035 M $K_3Fe(CN)_3$, and supporting electrolyte of 1.4 M $NH_4Cl$ & 0.1 M $(NH_4)_2HPO_4$ and Cycled at 10 mA/cm$^2$.

Figure 11A:
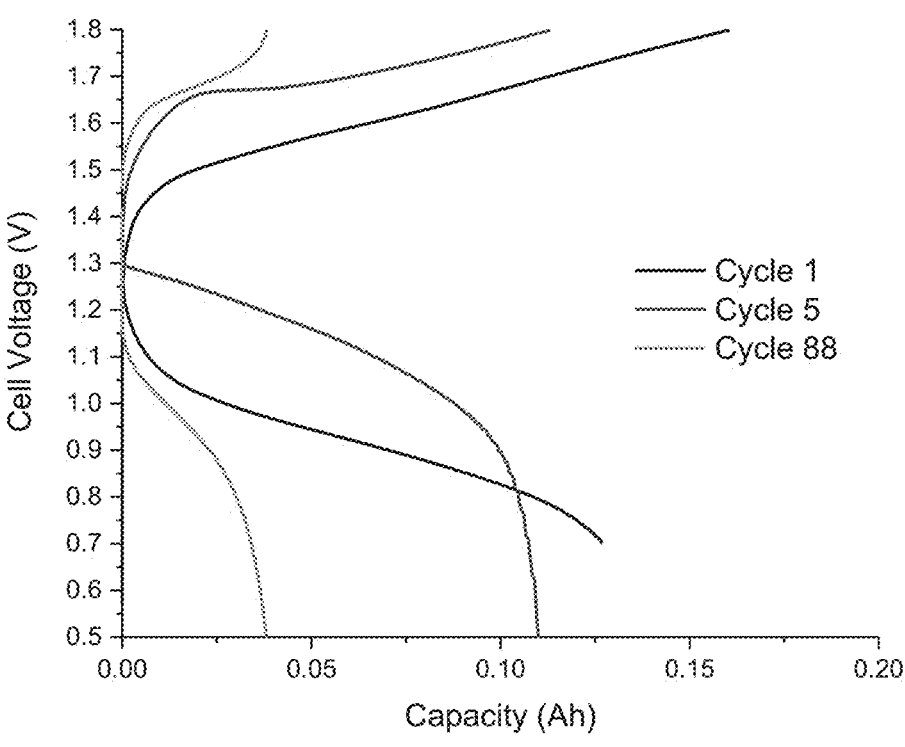
FIGS. 11A and 11B illustrates an example of flow battery data from an anolyte solution including voltage, cycling and capacity.
Figure 11B:
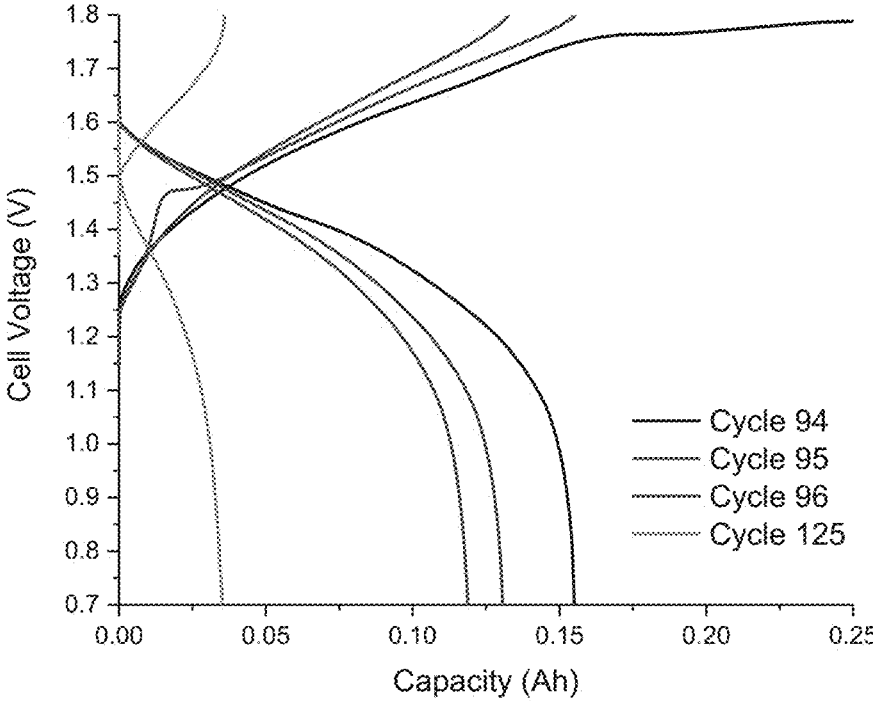

Referring to FIGS. 11A and 11B, flow battery data from an anolyte solution of ~0.74 M $TiOSO_4$ with 1 equivalent of nitrilotri(methylenephosphonic acid) brought to a pH of 7 with ammonia with an additional 0.1 M $(NH_4)_2HPO_4$ supporting electrolyte and a catholyte solution of 0.74 M $Fe(CN)_6^{4-}$ (from equal parts $Na_4Fe(CN)_6$ and $K_4Fe(CN)_6$), 0.035 M $K_3Fe(CN)_3$, and supporting electrolyte of 0.25 M $(NH_4)_2SO_4$ & 0.1 M $(NH_4)_2HPO_4$, After cycle 88 the FLAT electrodes at the anolyte were replaced with a combination of carbon paper and FLAT, and the catholyte exchanged. Cycled at 20 mA/cm$^2$ until cycle 5, then cycled at 10 mA/cm$^2$ thereafter.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. An anolyte for a redox-flow battery (RFB) comprising a metal-ion complex and a phosphonate-based ligand having a phosphonic group wherein the phosphonic acid group is directly coordinated to a metal-ion in solution, wherein the phosphonate-based ligand to metal ratio is between 1-3:1 and within pH range of 6-11, and the anolyte remains stable for repeated charge-discharge cycles and ionic balance.

2. The anolyte of claim 1 wherein the phosphonate groups, are 2-charged when deprotonated.

3. The anolyte of claim 1 wherein the phosphonate-based ligand is selected from the group consisting of etidronic acid, nitrilotri(methylenephosphonic acid), ethylenediaminetetra(methylenephosphonic acid), iminodi(methylphosphonic acid), methylenediphosphonic acid, (aminomethyl) phosphonic acid, 2-aminoethylphosphonic acid, N,N-bis (phosphonomethyl)glycine, N-(phosphonomethyl)glycine, N-(phosphonomethyl)iminodiacetic acid, phosphonoacetic acid, pyrophosphate, and trimetaphosphate.

4. The anolyte of claim 3 wherein the ligand is etidronic acid.

5. The anolyte of claim 3 wherein the ligand is nitrilotri (methylenephosphonic acid).

6. The anolyte of claim 1, wherein the metal ion is iron.

7. The anolyte of claim 6, wherein the ligand is etidronic acid.

8. The anolyte of claim 6, wherein the ligand is nitrilotri (methylenephosphonic acid).

9. The anolyte of claim 1, wherein the metal is titanium.

10. The anolyte of claim 9, wherein the ligand is etidronic acid.

11. The anolyte of claim 10, wherein the ligand is nitrilotri (methylenephosphonic acid).

12. The anolyte of claim 6, wherein a resulting iron-complex solubility is more than 0.8M in water at a pH of 8.

13. The anolyte of claim 6, wherein ligand to metal is a ratio of 2:1.

14. The anolyte of claim 9, wherein ligand to metal is a ratio of 1:1.

15. The anolyte of claim 1, wherein the metal center coordination sphere of the metal ion is fully saturated by etidronic acid ligands.

16. The anolyte of claim 1, wherein the metal center coordination sphere of the metal ion are occupied by aqua, hydroxo, or oxo groups.

17. The anolyte of claim 1, wherein the ligand to metal ratio is between 1-3:1 and within pH range of 6-14.

* * * * *